US008645905B2

(12) United States Patent
Halbedel

(10) Patent No.: US 8,645,905 B2
(45) Date of Patent: Feb. 4, 2014

(54) DEVELOPMENT ARTIFACT SEARCHING IN AN INTEGRATED DEVELOPMENT ENVIRONMENT

(75) Inventor: Ralf Halbedel, Heidelberg (DE)

(73) Assignee: SAP AG, Walldorf (DE)

( * ) Notice: Subject to any disclaimer, the term of this patent is extended or adjusted under 35 U.S.C. 154(b) by 313 days.

(21) Appl. No.: 12/946,476

(22) Filed: Nov. 15, 2010

(65) Prior Publication Data

US 2012/0124547 A1 May 17, 2012

(51) Int. Cl.
G06F 7/00 (2006.01)
G06F 17/30 (2006.01)
G06F 15/16 (2006.01)
H04L 29/06 (2006.01)
G06F 21/00 (2013.01)
G06F 17/00 (2006.01)
G06F 3/00 (2006.01)
G06F 9/44 (2006.01)

(52) U.S. Cl.
USPC ........... 717/100; 707/706; 709/203; 713/165; 713/182; 715/234; 715/237; 715/738; 715/747; 715/751; 717/121; 719/328; 726/14

(58) Field of Classification Search
None
See application file for complete search history.

(56) References Cited

U.S. PATENT DOCUMENTS 7,680,851 B2 * 3/2010 Liu et al. ........................ 707/706
7,725,449 B2 * 5/2010 Naam ............................. 715/237
7,743,157 B2 6/2010 Degenkolb et al.
7,836,411 B2 * 11/2010 Plow et al. .................... 715/811
7,930,410 B2 4/2011 Degenkolb et al.
7,962,470 B2 6/2011 Degenkolb et al.
8,131,764 B2 * 3/2012 Shelton ......................... 713/182
2007/0168947 A1 7/2007 Halbedel et al.
2007/0282879 A1 12/2007 Degenkolb et al.
2007/0283273 A1 * 12/2007 Woods ........................ 715/738
2007/0299825 A1 * 12/2007 Rush et al. ....................... 707/3
2008/0072210 A1 * 3/2008 Rush et al. .................... 717/121
2009/0006402 A1 1/2009 Bohle et al.
2009/0006539 A1 * 1/2009 Degenkolb et al. ........... 709/203
2009/0049539 A1 * 2/2009 Halbedel et al. ................ 726/14

(Continued)

OTHER PUBLICATIONS

Alessandro Bozzon et al., Searching Repositories of Web Application Models 2010, [Retrieved on Sep. 5, 2013].. Retrieved from the internet: <URL: http://link.springer.com/content/pdf/10.1007%2F978-3-642-13911-6_1.pdf> 15 Pages (1-15).*

(Continued)

Primary Examiner — Don Wong
Assistant Examiner — Anibal Rivera
(74) Attorney, Agent, or Firm — Fish & Richardson P.C.

(57) ABSTRACT

This disclosure provides various embodiments for searching one or more repositories hosting, storing, or maintaining a plurality of development artifacts. A search query for development artifacts is received through an interface of an integrated development environment, the search query identifying at least one search term. An index is used to identify a set of search results, the index identifying a plurality of development artifacts and including context data identifying, for each development artifact in the plurality of development artifacts, at least one attribute of the respective development artifact. The set of search results identify a subset of the plurality of development artifacts determined to potentially relate to the at least one search term. At least a portion of the set of search results are presented to a user, the listing including at least one development artifact in the subset of the plurality of development artifacts.

21 Claims, 5 Drawing Sheets

(56) References Cited

U.S. PATENT DOCUMENTS

| | | | |
|---|---|---|---|
| 2009/0094137 A1* | 4/2009 | Toppenberg et al. | 715/234 |
| 2009/0138706 A1* | 5/2009 | Rajasekaran et al. | 713/165 |
| 2010/0106705 A1* | 4/2010 | Rush et al. | 707/709 |
| 2010/0223630 A1 | 9/2010 | Degenkolb et al. | |
| 2011/0078583 A1* | 3/2011 | Chunilal | 715/747 |
| 2011/0099159 A1* | 4/2011 | Trevor et al. | 719/328 |
| 2011/0154220 A1* | 6/2011 | Chunilal | 715/751 |

OTHER PUBLICATIONS

Renuka Sindhgatta et al., Using an Information Retrieval System to Retrieve Source Code Samples, May 20-28, 2006, [Retrieved on Sep. 5, 2013]. Retrieved from the internet: <URL: http://dl.acm.org/citation.cfm?id=1134448> 4 Pages (905-908).*

* cited by examiner

DEVELOPMENT ARTIFACT SEARCHING IN AN INTEGRATED DEVELOPMENT ENVIRONMENT

TECHNICAL FIELD

This present disclosure relates to search engine technology, and, more particularly searching repositories of development artifacts.

BACKGROUND

Application developers and programmers use various tools, systems, and methods to generate applications, programs, and interfaces. Generally, applications are developed in one of a plurality of development technology platforms, including Microsoft's .NET, Sun System's Java, SAP's ABAP, Perl, or other suitable programming languages and development environments. Some integrated development environments ("IDEs") are associated with a specific programming language, so as to provide a feature set which more closely matches the programming requirements, syntax, and operations of the specific programming language, while other IDEs may be used with multiple programming languages. Development artifacts, including use cases, class diagrams, and Unified Modeling Language (UML) models, can be produced as a by-product of a software development effort, including development using an IDE. Some development artifacts can be used and re-used within the context of an IDE.

Search engines exist that assist computer users in finding resources stored on one or more computing systems, including a network of computing systems. With the advent of the Internet, search engines have grown in speed and functionality, to accommodate demand for finding the billions of resources stored in computing systems connected across the Internet. Web search engines, for instance, are search engines designed to search for information on the Internet. Typically, a user submits a search query specifying certain keywords, criteria, or conditions and the search engine consults an index to determine which resources, known to the search engine, likely satisfy the search query. Results of the search, also known as "hits," can be returned to the user. In some cases, the user can access or request the resources included in a listing of hits directly from the listing.

SUMMARY

This disclosure provides various embodiments for searching one or more repositories hosting, storing, or maintaining a plurality of development artifacts. A search query for development artifacts can be received through an interface of an integrated development environment, the search query identifying at least one search term. An index can be used to identify a set of search results, the index identifying a plurality of development artifacts and including context data identifying, for each development artifact in the plurality of development artifacts, at least one attribute of the respective development artifact. The set of search results can identify a subset of the plurality of development artifacts determined to potentially relate to the at least one search term. At least a portion of the set of search results can then be presented to a user, the listing including at least one development artifact in the subset of the plurality of development artifacts.

While generally described as computer implemented software that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims

DESCRIPTION OF DRAWINGS

Like reference symbols in the various drawings indicate like elements.

DETAILED DESCRIPTION

This disclosure generally describes software, computer-implemented methods, and systems relating to providing search functionality within an integrated development environment. More particularly, a development artifact search engine can be provided that is adapted to search a plurality of repositories storing or hosting development artifacts within a computing system. Such development artifacts can be used, developed, analyzed, compiled, and tested within an integrated development environment. Large software companies and organizations, such as open-source development networks, produce and store terabytes of software development artifacts in connection with the development of software scripts, applications, and files. Given the size of these organizations, it is not uncommon for developers to inadvertently re-invent the wheel during their development and coding efforts, as it can be nearly impossible to track what parallel development efforts may be taking place, such as in other business units or other projects, that could be of benefit to a particular developer. Additionally, multiple data repositories can be maintained across dozens, and even thousands of computing devices, making it difficult to pinpoint what development artifacts are available for use and incorporation in a software development project and where these artifacts are stored. Accordingly, a search engine tool incorporated in an integrated development environment can be used, for example, within a large software development network, to assist in identifying development artifacts that can be used in connection with an integrated development environment.

A software development artifact can include one of many kinds of deliverable by-products produced during the development of software. Development artifacts can include use cases, class diagrams, models, classes, interfaces, data objects, and user interface views, web pages, templates, patterns, attributes, database tables, views, domains, indexes, schemas, queries, reports, function modules, services (including web and RESTful services), and specification and design documents. Some development artifacts can include project plans, business cases, and risk assessments relating to the development process. In some cases, development artifacts can include partial or compilable source code files, including executable and non-executable files, such as files adapted for non-execution-based testing and verification such as a walkthrough or dry-run, performable, in some instances, using the integrated development environment.

Figure 1:
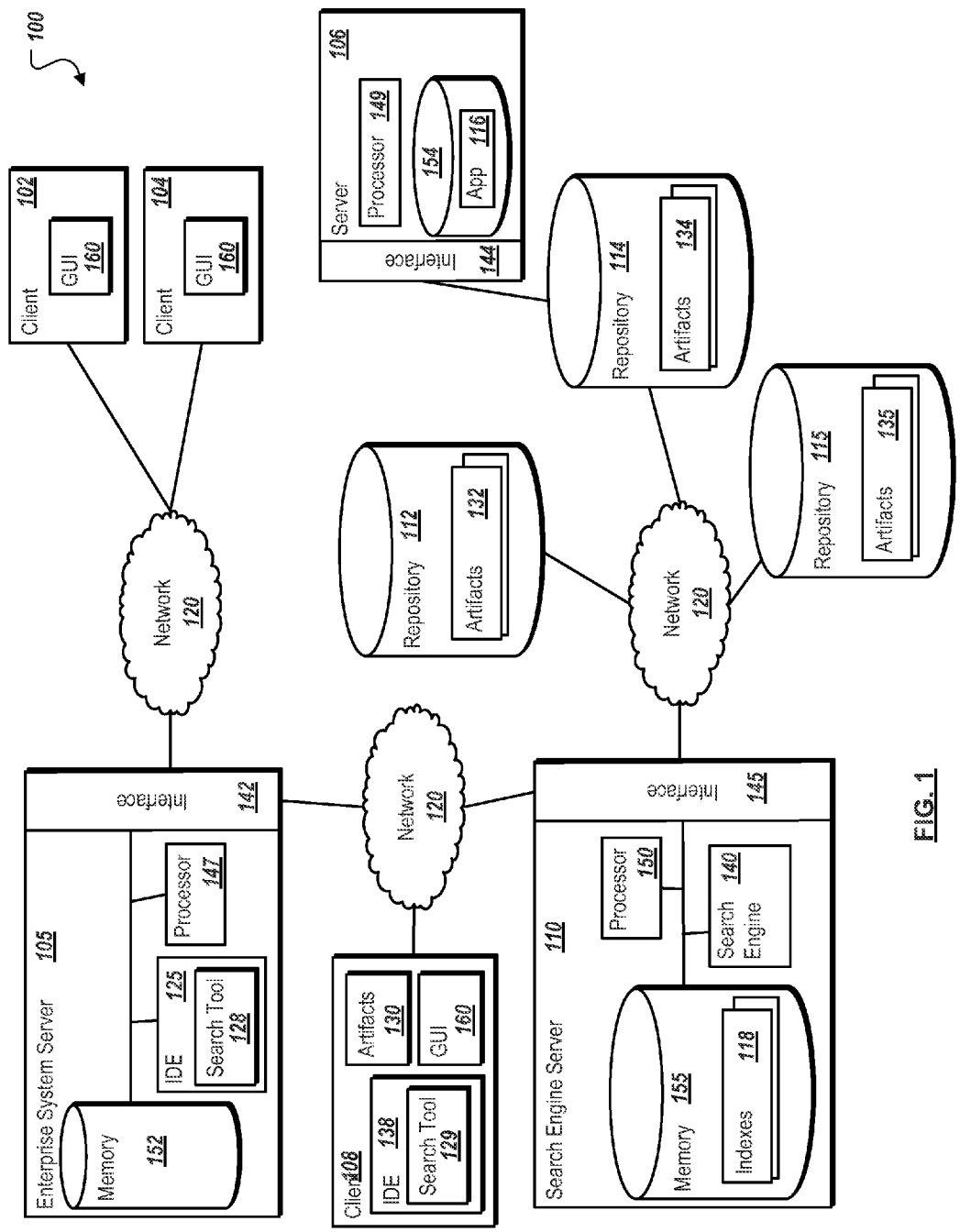
FIG. 1 illustrates an example system for providing a development artifact search engine in connection with an integrated development environment.

Turning to the example implementation of FIG. 1, the illustrated software environment 100 includes, or is communicably coupled with, one or more clients 102, 104, 108, one or more enterprise system servers 105, one or more application servers 106, a search engine server 110, and one or more repositories 112, 114, 115, using one or more networks 120. Each of the servers 105, 106, 110 comprise electronic computing devices operable to receive, transmit, process, store, or manage data and information associated with the software environment 100. As used in this document, the term "computer" is intended to encompass any suitable processing device. For example, the environment 100 may be implemented using computers other than servers, including a server pool. Further, any, all, or some of the servers 105, 106, 110 may be adapted to execute any operating system, including Linux, UNIX, Windows Server, or any other suitable operating system.

In the illustrated embodiment, the enterprise system server is one or more computing devices used to provide enterprise software services to one or more customers, such as clients 102, 104, 108. Among the services provided by the enterprise software system, an integrated development environment 125 can be provided that includes a development artifact search tool 128. A development artifact search tool (e.g., 128, 129) can make use of search functionality provided through a search engine 140 hosted by search engine server 110, the search engine 140 adapted to search development artifacts 130, 132, 134, 135 hosted by or stored at a plurality of data repositories (e.g., 112, 114, 115) and computing systems (e.g., 108). Clients 102, 104, 108, as well as other users external to environment 100 or enterprise system server 105, can, directly or indirectly (e.g., via a proxy, virtual machine interface, etc.) access and use enterprise services provided by enterprise system server 105, including use of IDE 125. Additionally, clients 102, 104, 108 can, directly or indirectly, access and perform development artifact searches through search engine server 110. For instance, clients 102, 104 can conduct searches through a search tool 128 made available through the IDE service 125 served by enterprise software server 105. In other examples, a client 108 running an IDE 138 outside of the IDE 125 provided through enterprise software server 105, can also access the development artifact search functionality provided through search engine 140, for example, through a search tool 129 integrated with IDE 138. In some instance, IDE 138 can be run locally on client 108 or through a remote software system (not shown). As with IDE 125, IDE 138 can also include a search tool allowing search functionality, made available through search engine server 110, to be integrated into the IDE 138.

The search engine server 110 can include one or more processors 150 executing software comprising the search engine 140. The processor 150 executes instructions and manipulates data to perform search engine 140 operations and tasks (described below) as well as serve development artifact search services to a plurality of search service consumers, including applications (e.g., 116), systems, and programs remote from the search engine server 110. One or more search indexes 118, stored in memory 155, can be generated, managed, accessed, and otherwise used by the search engine 140 to provide development artifact search services. The search engine server 110 can be adapted to serve development artifact searching to consumers in a variety of contexts including local, private, distributed, enterprise, and cloud-computing software system environments. The search engine server 110 can be implemented using a single processor 105 or multiple processors, including multiple processors operating in a network or pool of computing devices, including parallel processing and cloud computing environments.

A plurality of repositories 112, 114, 115 storing development artifacts 132, 134, 135 can be searched by search engine 140. The repositories 112, 114, 115 can, in some instances, be associated with computing devices and systems, such as systems and applications (including IDEs) responsible for creating, modifying, and managing the development artifacts 132, 134, 135. For instance, a repository 114 and development artifacts 134 can be associated with a particular application server 106, and in some cases associated computing systems and devices can create and manage at least a portion of the development artifacts maintained by the associated repository. In some instances, repositories can be a part of or otherwise associated with an enterprise software system (e.g., 105) including users and consumer clients (e.g., 102, 104, 108) of the enterprise software system. Repositories can also be searched that are remote from or are not directly associated with the enterprise software system or search engine server 110, including repositories maintaining development artifacts created and managed by third-party entities or repositories implemented on computing devices within a cloud computing environment.

In the present example, enterprise system servers 105, application servers 106, and search engine servers 110 can each include at least one interface (142, 144, 145, respectively), one or more processors (147, 149, 150, respectively), and computer-readable memory (152, 154, 155, respectively). In some instances, some combination of enterprise system servers 105, application servers 106, and search engine servers 110 can be hosted on a common computing system, server, or server pool, and share computing resources, including shared memory, processors, and interfaces. The interfaces 142, 144, 145 can be used for communicating with other systems in a client-server or other distributed environment (including within environment 100) connected to the network 120, for example the one or more clients 108, repositories 112, 114, 115, or any other computing device adapted to interface with the servers 105, 106, 110, including devices not illustrated in FIG. 1. Generally, each interface 142, 144, 145 comprises logic encoded in software and/or hardware in a suitable combination and operable to communicate with the network 120. More specifically, the interfaces 142, 144, 145 may comprise software supporting one or more communication protocols associated with communications such that the network 120 or hardware is operable to communicate physical signals within and outside of the illustrated software environment 100.

Each of the example servers 105, 106, 110 also includes a processor (147, 149, 150, respectively). Each processor 147, 149, 150 executes instructions and manipulates data to perform the operations of the associated server 105, 106, 110, and may comprise, for example, a central processing unit (CPU), a blade, an application specific integrated circuit (ASIC), or a field-programmable gate array (FPGA), among other suitable options. Although each processor 147, 149, 150 is illustrated as a single processor, multiple processors may be used according to the particular needs of the associated server. References to a single processor 147, 149, 150 are meant to include multiple processors where applicable. The operations that each processor 147, 149, 150 executes are determined by the purpose and operations of its associated server. Generally, the processor 147, 149, 150 executes instructions and manipulates data to perform the operations of its respective server and, specifically, the software systems, services, and applications hosted by the servers 105, 106, 110.

At a high level, each "server" (e.g., 105, 106, 110) includes one or more electronic computing devices operable to receive, transmit, process, store, or manage data and information associated with the environment 100. Specifically, a server is responsible for receiving requests from one or more clients and sending the appropriate response the requesting client. In addition to requests from external clients, requests may also be sent from internal users, external or third-party customers, other automated applications, as well as any other appropriate entities, individuals, systems, or computers. For example, although FIG. 1 illustrates a single server for each of enterprise system server 105, application server 106, and search engine server 110, a server can be implemented using two or more servers, as well as computers other than servers, including a server pool. Indeed, a server may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 102 may be adapted to execute any operating system, including Linux, UNIX, Windows, Mac OS, or any other suitable operating system.

In the case of an application server 106, the processor 149 can execute the functionality required to receive and respond to requests from clients, as well as client applications interfacing with the server's hosted application 116. It will be understood that the term "application server" (e.g., 106) can include any suitable software component or module, or computing device(s) capable of hosting and/or serving a software application, including distributed, enterprise, or cloud-based software applications. Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. Applications can be implemented as individual modules that implement the various features and functionality through various objects, functions, procedures, methods, or other processes, or may instead include a number of sub-modules, third party services, components, libraries, and such, as appropriate. Conversely, the features and functionality of various components can be combined into single components as appropriate.

At a high level, each of the one or more hosted applications and services (e.g., 116, 125, 138, 140) illustrated in the environment 100 can include any application, program, module, process, or other software that may execute, create, change, delete, generate, or otherwise manage information according to the present disclosure, particularly in response to and in connection with one or more requests received from the illustrated clients 102, 104, 108, as well as other applications. In certain cases, only one hosted application may be located at a particular server. In others, a plurality of related and/or unrelated hosted applications may be stored at a single server, or located across a plurality of other servers, as well. In certain cases, environment 100 may implement a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, applications may represent web-based applications accessed and executed via the network 120 (e.g., through the Internet, or within internal networks such as intranets). Further, one or more processes associated with a particular hosted application or service may be stored, referenced, or executed remotely. For example, a portion of a particular hosted application or service may be a web service associated with the application that is remotely called, while another portion of the hosted application may be an interface object or agent bundled for processing at a remote client (e.g., 102, 104, 108). Moreover, any or all of the hosted applications and software service may be a child or sub-module of another software module or enterprise application (not illustrated) without departing from the scope of this disclosure. Still further, portions of a hosted application can be executed by a user working directly at a server (e.g., 106) hosting the application, as well as remotely at a client (e.g., 102).

Each of the example servers 105, 106, 110 also includes a memory (152, 154, 155, respectively). Further, repositories 112, 114, 115 can also each have at least one associated memory device. Each memory may include any memory or database module and may take the form of volatile or non-volatile memory including, without limitation, non-transitory memory elements, magnetic media, optical media, random access memory (RAM), read-only memory (ROM), removable media, or any other suitable local or remote memory component. Each memory may store various objects or data, including classes, frameworks, applications, backup data, business objects, jobs, web pages, web page templates, database tables, content repositories storing business or other dynamic information, or other information including any parameters, variables, algorithms, instructions, rules, constraints, or references thereto relevant to the purposes of the particular server. Each memory may also include any other appropriate data, such as firmware logs and policies, firewall policies, a security or access log, print or other reporting files, as well as others. Again, the particular data and instructions stored in each memory (e.g., 152, 154, 155) will be described in detail below in connection with the illustrated implementations of the software environment 100 and components thereof.

Generally, the network 120 facilitates wireless or wireline communications between the components of the software environment 100 (e.g., between the search engine server 110, development artifact repositories (e.g., 112, 114, 115) and one or more consumer clients (e.g., 102, 104, 108), the search engine server 110 and the enterprise system server 105, the enterprise system server 105 and clients (e.g., 102, 104, 108), as well as between other components as appropriate), as well as with any other local or remote computer, such as those associated with one or more applications or external data sources. The network 120 can be implemented as one or more distinct networks. In any implementation, the network 120 may be a continuous or discontinuous network without departing from the scope of this disclosure, so long as at least a portion of the network 120 may facilitate communications between senders and recipients. The network 120 may be all or a portion of an enterprise or secured network. As an example, in FIG. 1 networks 120 may represent a portion of an enterprise network, or a connection to the Internet. In some instances, a portion of the network 120 may be a virtual private network (VPN). All or a portion of the network 120 can comprise either a wireline or wireless link. Example wireless links may include 802.11a/b/g/n, 802.20, WiMax, and/or any other appropriate wireless link. In other words, the network 120 encompasses any internal or external network, networks, sub-network, or combination thereof operable to facilitate communications between various computing components inside and outside the illustrated environment 100. The network 120 may communicate, for example, Internet Protocol (IP) packets, Frame Relay frames, Asynchronous Transfer Mode (ATM) cells, voice, video, data, and other suitable information between network addresses. The network 120 may also include one or more local area networks (LANs), radio access networks (RANs), metropolitan area networks (MANs), wide area networks (WANs), all or a portion of the Internet, and/or any other communication system or systems at one or more locations.

The illustrated implementation of FIG. 1 includes one or more local and/or remote clients 102, 104, 108. A client 102, 104, 108 can be any computing device operable to connect or communicate at least one server (e.g., 105. 106, 110) and/or the network 120 using a wireline or wireless connection. Each client 102, 104, 108 includes a GUI 160. In general, the client 102, 104, 108 comprises an electronic computing device operable to receive, transmit, process, and store any appropriate data associated with the software environment of FIG. 1. It will be understood that there may be any number of clients 102, 104, 108 associated with environment 100, as well as any number of clients 102, 104, 108 external to environment 100. Further, the term "client" and "user" may be used interchangeably as appropriate without departing from the scope of this disclosure. Moreover, while each client 102, 104, 108 is described in terms of being used by one user, this disclosure contemplates that many users may use one computer or that one user may use multiple computers. As used in this disclosure, the client 102, 104, 108 is intended to encompass a personal computer, touch screen terminal, workstation, network computer, kiosk, wireless data port, smart phone, personal data assistant (PDA), one or more processors within these or other devices, or any other suitable processing device. For example, the client 102, 104, 108 may comprise a computer that includes an input device, such as a keypad, touch screen, mouse, or other device that can accept information, and an output device that conveys information associated with operations of one or more applications stored and/or executed on an application server (or other servers in environment 100) or on the client 102, 104, 108 itself, including digital data, visual information, or the GUI 160. Both the input device and the output device may include fixed or removable storage media such as a magnetic computer disk, CD-ROM, or other suitable media to both receive input from and provide output to users of the clients 102, 104, 108 through the display, namely the GUI 160.

The GUI 160 comprises a graphical user interface operable to allow the user to interface with at least a portion of environment 100 for any suitable purpose, including allowing a user to interact with one or more software applications, including an IDE (e.g., 125) or search engine (e.g., 140). Generally, the GUI 160 provides users with an efficient and user-friendly presentation of data provided by or communicated within the system. The term "graphical user interface," or GUI, may be used in the singular or in the plural to describe one or more graphical user interfaces and each of the displays of a particular graphical user interface. Therefore, the GUI 160 can be any graphical user interface, such as a native rich client, web browser, touch screen, or command line interface (CLI) that processes information in the environment 100 and efficiently presents the results to the user. In general, the GUI 160 may include a plurality of user interface (UI) elements such as interactive fields, pull-down lists, media players, tables, graphics, virtual machine interfaces, buttons, etc. operable by the user at the client 108. These UI elements may be related to the functions of one or more applications or services (e.g., 116, 125, 140), including applications (e.g., 138) hosted locally at the client.

While FIG. 1 is described as containing or being associated with a plurality of elements, not all elements illustrated within environment 100 of FIG. 1 may be utilized in each alternative implementation of the present disclosure. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
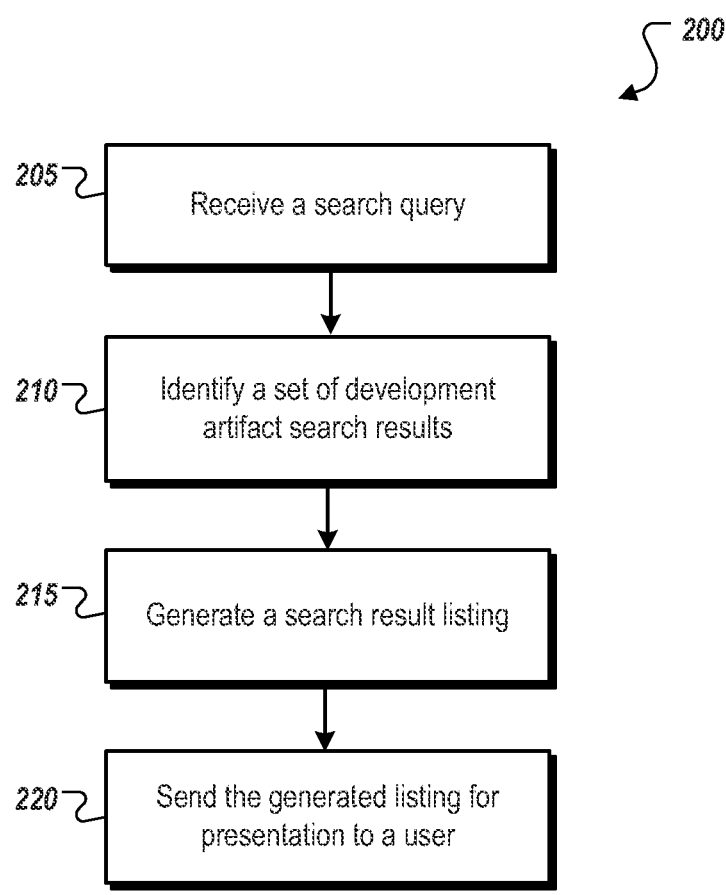
FIG. 2 is a flowchart of an example technique for generating a set of search results in response to a search of development artifacts.

Turning now to the flowchart 200 of FIG. 2, an example technique is shown for generating development artifact search results in connection with an integrated development environment. A search query can be received 205, for example, through an interface of an integrated development environment. The search query can include one or more search terms and be directed to a search of development artifacts, including structured and unstructured data, stored in one or more repositories. An index can be used to identify 210 a set of search results, the index identifying a plurality of development artifacts and including context data identifying, for each development artifact in the plurality of development artifacts, at least one attribute of the respective development artifact. Context data can specify key users, departments, projects, repositories, descriptors, metadata, and other information that can be considered when searching the set of development artifacts stored in the one or more repositories. The set of search results can identify that subset of the searched plurality of development artifacts determined to potentially relate to the at least one search term. A listing can then be generated 215 that identifies at least a portion of the set of search results. The listing can be sent and presented 220 to a user, or a system or application adapted to use and further process the listing of search results to provide additional services. This presented 220 listing can be adapted to allow a user to select at least one particular development artifact or other content from the listing. In such instances, the selection of a particular development artifact from the listing can result in the receipt of a corresponding user request to retrieve at least one particular development artifact from the subset of the plurality of development artifacts stored on the repositories. In response to the request, the specified development artifact can be retrieved for use by the user in the integrated development environment.

In some instances, an example technique for generating development artifact search results in connection with an integrated development environment, such as described in FIG. 2, can further include the generation of the index used to identify a set of search results of development artifacts corresponding to a search query. For instance, a data crawler can be used to poll, mine, query, and otherwise access repositories of development artifacts to identify development artifacts included in the repositories together with context data for the identified development artifacts. An index can be built and supplemented using the data mined by the crawler, so as to build an index of the corpus of development artifacts searchable by a search engine integrated with an integrated development environment. In some instances, once a development artifact has been created, changed or deleted, the IDE, or search engine operating in connection with the IDE, can interface directly with the search engine's crawler and invoke indexing of the artifact to allow dynamic, real time updating of the index corresponding to changes to the artifact.

Context data relating to or describing various attributes and characteristics of a development artifact can include structured and unstructured information, including information collected from repositories other than the repository hosting the artifact. Structured context data can include identifiers including artifact ID, fieldlength of database fields, types, class or method names, database table names, UI controls, etc. Unstructured context data can include longtexts for database and UI, unstructured documents, including javadoc for classes, methods, and package docu, as well as unstructured online help and other repositories. Additionally, package, version, and release information can also be included in context data and relate to a larger project or software product of which the development artifact is a part or with which it is associated. Context data can also identify the author of the artifact, as well as users who have previously modified, accessed, or even searched for the development artifact. Additionally, context data for an artifact can include information detailing the dates of the development artifact's creation, last change, or last access. Other context data can further identify projects, business units, working groups, and development categories with which the development artifact is associated as well as other attributes of the development artifact. Context data for a particular development artifact can be used to identify that the particular development artifact satisfies a given search query. Additionally, in some instances, a listing of search results can include presentation of some context data associated with the development artifact (e.g., associated development categories or projects, last changed data, author or key user identifier, etc.) to supplement the information presented in the listing as well as guide a user's selection of the most relevant development artifacts returned for the user's query.

Figure 3:
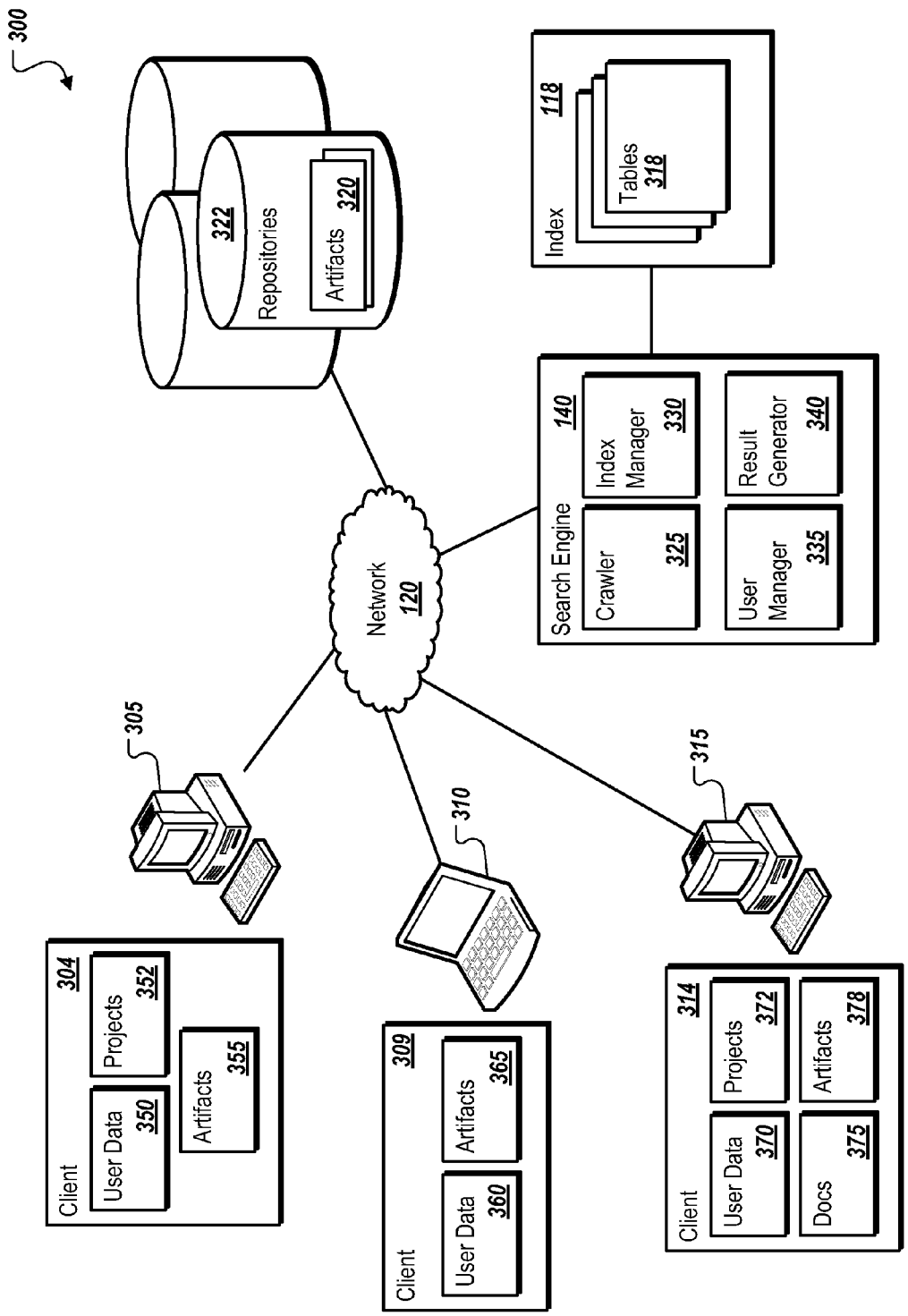
FIG. 3 illustrates an example system contributing to the development of an index for use in searching a repository of development artifacts.

In some instances one or more search indexes can be constructed and used to generate a set of search results based on a search query of a search corpus that includes plurality of development artifacts. FIG. 3 illustrates an example system 300 including one or more users 304, 309, 314 utilizing one or more computing devices 305, 310, 315 to use and develop development artifacts 355, 365, 378 that can be included in the search corpus. The search corpus can be indexed in one or more indexes 118 including one or more tables 318 or other data structures adapted to be searched and maintained by a search engine 140. The search engine 140 can include crawler 325, an index manager 330, a user manager 335, and result generator 340.

The search engine crawler 325 can access, read, and otherwise identify development artifacts 320 stored in a set of development artifact repositories 322. The crawler 325 can periodically or continuously poll the repositories 322 to discover development artifacts not already identified in the search index 118 as well as identify changes to artifacts already included in the search index. The crawler 325 can identify aspects and characteristics of the development artifacts including the content of the development artifact, its location (e.g., the address, directory or particular repository on which it is stored), type (e.g., language type, unstructured/structured), metadata of the development artifact, as well as other data describing the development artifact. The crawler 325 can also identify resources stored on the repositories relating to the development artifacts, such as projects associated with the development artifact, the creator or administrator of the development artifact, user data identifying prior uses of the development artifacts by a user, and other data. An index manager 330 can use the data collected by the crawler 325 to build or update one or more search indexes 118.

The search engine can further include a result generator 340 adapted to generate a set of search results responsive to a given query for development artifacts hosted or stored by a set of repositories. The result generator 340 can utilize the indexes 118 managed by the index manager 330 to identify development artifacts satisfying a received user search query. The result generator 340 can utilize one or more of a variety of search algorithms and techniques including fuzzy searching, lexical searching, cross-language searching, Boolean and non-Boolean logic, filtering, natural language searching, non-text searching (such as graphical searching), and other techniques.

In some instances, the result generator 340 can operate in conjunction with a user manager 335 to tailor search results for a particular user. The user manager 335 can collect and maintain data pertaining to one or more users of the search engine 140, an integrated development environment interfacing with, integrated with, or otherwise associated with the search engine 140, or development artifacts 320 searched by the search engine 140. The user manager 335 can identify preferences of a user, either based on preexisting user profile data, or intelligently based on users' habits and uses of any one of the development artifacts 320, integrated development environment, or search engine 140. The user manager 335 can also interact with the crawler 325, index manager 330, and/or result generator 340 to develop indexes of user data that can also be considered in generating search results for a given query, including user-customized search results.

A search index 118 developed, maintained, and used by a development artifact search engine 140 can include fields and tables identifying the development artifacts 320, descriptions of the development artifacts 320, development artifact metadata, and other data describing the characteristics of the development artifacts 320. Additional fields and indexes can be maintained for the search corpus that describe the use of the development artifacts 320, for example, by users 304, 309, 314. As shown in FIG. 3, users 304, 309, 314 can be associated with various projects (e.g., 352, 372), development artifacts (e.g., 355, 365, 378), documentation (e.g., 375), and user profiles (e.g., 350, 360, 370). For instance, user 304 can be identified as associated with development artifacts 355. A user can be associated with a development artifact based on a prior use of the development artifact, including creation or modification of the artifact, or based on the user's identity, roles, permission levels, or associations. For example, a particular development artifact may be adapted for use with a particular work group of which the user is a member. A user (e.g., 314) can also be identified with a particular project (e.g., 352, 372). Information regarding the project, including a business unit with which it is associated, a development category (e.g., user interface design, application design, operating system and kernel design, software modeling, and others), development artifacts associated with the project, and other data can be identified for the project as well as the development artifact. Further documentation (e.g., 375) pertaining to one or more development artifacts, their use, functionality, and characteristics, can be published, owned, maintained, or accessed by a particular user (e.g., 314). Further, user profiles (e.g., 350, 360, 370) can be maintained for users of the search engine identifying users' preferences, characteristics, and use histories. For instance, a user profile can maintain data describing the role of the user within an organization, the projects, groups, organizations, and business units with which the user is associated, the user's experience level, programming languages, project types, language, and other data.

Development artifact use data and user data can be used to enhance, filter, rank, sort, and personalize search results generated in a response to a query directed to a search corpus including a set of development artifacts. For instance, a set of search results can be created by using heuristics based on index data describing a prior user's access and use of certain development artifacts and related search results. As an example, a user can filter or sort a set of search results directed to a particular query based on programming language, project type (e.g. open source), develop artifact type, etc. In filtering, ranking, or sorting a set of search results based on a specified programming language, a set of users can be identified that have expertise with the specified programming language. Further, data identifying these users' preferences for associations and interactions with particular development artifacts can be identified and considered. For instance, development artifacts recently accessed by a particular set of users or identified as particularly popular with a particular set of users, can be scored or otherwise favored above other development artifacts in the set of search results, given their popularity with this set of users.

Additionally, indexed user data and development artifact use data can be used to personalize the set of search results for a user. As an illustrative example, a particular user 304 may be associated with a particular project 352 that is generally focused on developing a certain type of software. A set of search results generated for a particular search query for the user 304 can include development artifacts relating to types of software other than the those in which the user is primarily interested. The identity of the user 304 can be automatically identified by the search engine, for example using the user manager 335, including the user's association with the particular project 352. From this data, it can be determined that the user likely prefers development artifacts identified as having been used in, designed for, or previously accessed by other users involved in a similar project or developing the types of software with which the user's business unit is typically associated. For example, it may identified that a project 372 with which a second user 314 is associated, is related to the project 352 associated with the first user 304. Consequently, an index cataloguing the second user's 372 associations with particular development artifacts can be considered when generating a set of search results for the first user 304 to help point the first user 304 toward development artifacts likely considered useful by other users (e.g., 314) engaged in similar design work.

The development artifacts identified as likely being of interest to the user based on their association with a particular type of software development can be presented to the user more prominently than those development artifacts in the set of search results not identified as associated with the particular software types. Presenting development artifacts more prominently can include highlighting the respective development artifacts, presenting the artifacts near the top of the search result set, or automatically sorting or filtering the presentation of search results based on the identified criteria. In other instances, user data can be used to restrict access to certain development artifacts based on a user's role or permissions. Indeed, search results sets generated for a user can be similarly filtered to limit which development artifacts are returned in the search based on the user's role or permissions. For example, certain development artifacts may be designated as proprietary and access to these development artifacts can be restricted to particular users, such as users having a certain administrative or ownership role or identified as belonging to a particular company or organization.

Figure 4:
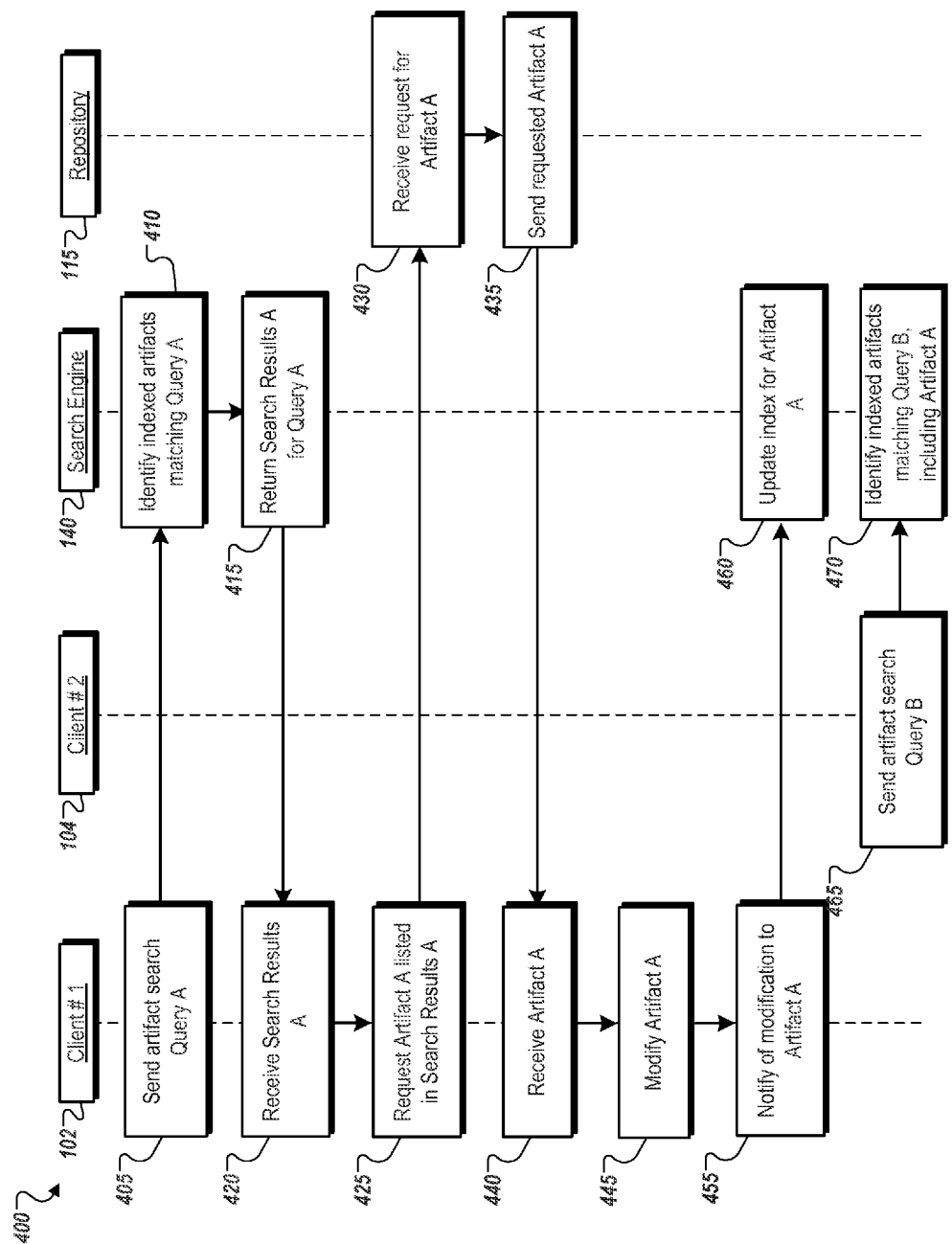
FIG. 4 is a flowchart of an example technique for updating an index of development artifacts in real time.

In some instances, the indexes 118 used by the search engine 140 can be updated dynamically and in real time to reflect the creation and modification of development artifacts in repositories accessed by the search engine. FIG. 4 is a flowchart 400 illustrating an example of incorporating development artifact changes in development artifact searches in real time. A first client 102 can send a first development artifact search query 405 (e.g., using a search tool, such as development artifact search tool 128, 129 of IDE 125, 138) to a development artifact search engine 140 operating in connection with an integrated development environment. In response to the request 405, the search engine 140 can identify 410 development artifact hits matching the query and return 415 the corresponding search results to the querying client 102 (e.g., using result generator 340, applying filters, ranks, user preferences from user manager 335). Upon receiving 420 the search results, a user operating the client 102 can request 425 the retrieval of a particular development artifact included in the search results. The request 425 can be transmitted to a repository 115 identified as storing, hosting, or maintaining the requested development artifact. Upon receiving 430 the request, the repository 115 can send 435 the requested development artifact to the client 102. The client 102 can receive 440 the development artifact from the repository, for instance over a network 120, for use in an integrated development environment operable, at least in part, through the client 102.

"Sending" and "receiving" the development artifact from the repository 115 can include granting read- and/or write-access to the development artifact, where the development artifact is maintained at, accessed, and manipulated from the repository 115. In other instances, the client can "check-out" the development artifact, "checking-back-in" the artifact to the repository when finished with the artifact. In any event, a user of the client can modify 445 the retrieved or accessed 440 development artifact, or even add new artifacts, for instance, using the integrated development environment. Modifications 445 made by the user of client 102 can be saved, recognized, transmitted, or otherwise communicated to the repository 115. Further, these changes can be automatically forwarded, propagated, communicated, or otherwise identified by or communicated 455 to the search engine 140. Indeed, these modifications, in some instances, can be communicated 455 and recognized by the search engine 140 substantially immediately following the modifications by the user at client 102. For instance, immediately upon receiving notification of the modification, the search engine can update 460 one or more search indexes, used by the search engine 140, to reflect the modifications made 445 by the user. As a result, the updated index can be used to field a subsequent query sent 465 by a client 104 and generate 470 a set of search results in response to the request that potentially include the recent updates to Artifact A.

In some instances, the modification 445 by client 102 can affect the outcome of subsequent searches. For example, a subsequent query sent 465 after the modification 445 can be substantially identical to the query 405 that returned 415 the modified development artifact in the first place. Due to the modification 445 of the artifact, and the updating 460 of the search index, however, the modified aspects of the artifact can result in the modified artifact not meeting the terms of the subsequent search query. Further, in instances where the search engine 140 is communicatively coupled to repositories 115 searched by the search engine 140, modifications, or deletions of an existing artifact, and creations of new artifacts hosted on the repositories can be communicated to the search engine so as to update the corresponding search index substantially immediately, or in "real time," using techniques similar to that shown and described in connection with FIG. 4.

Figure 5:
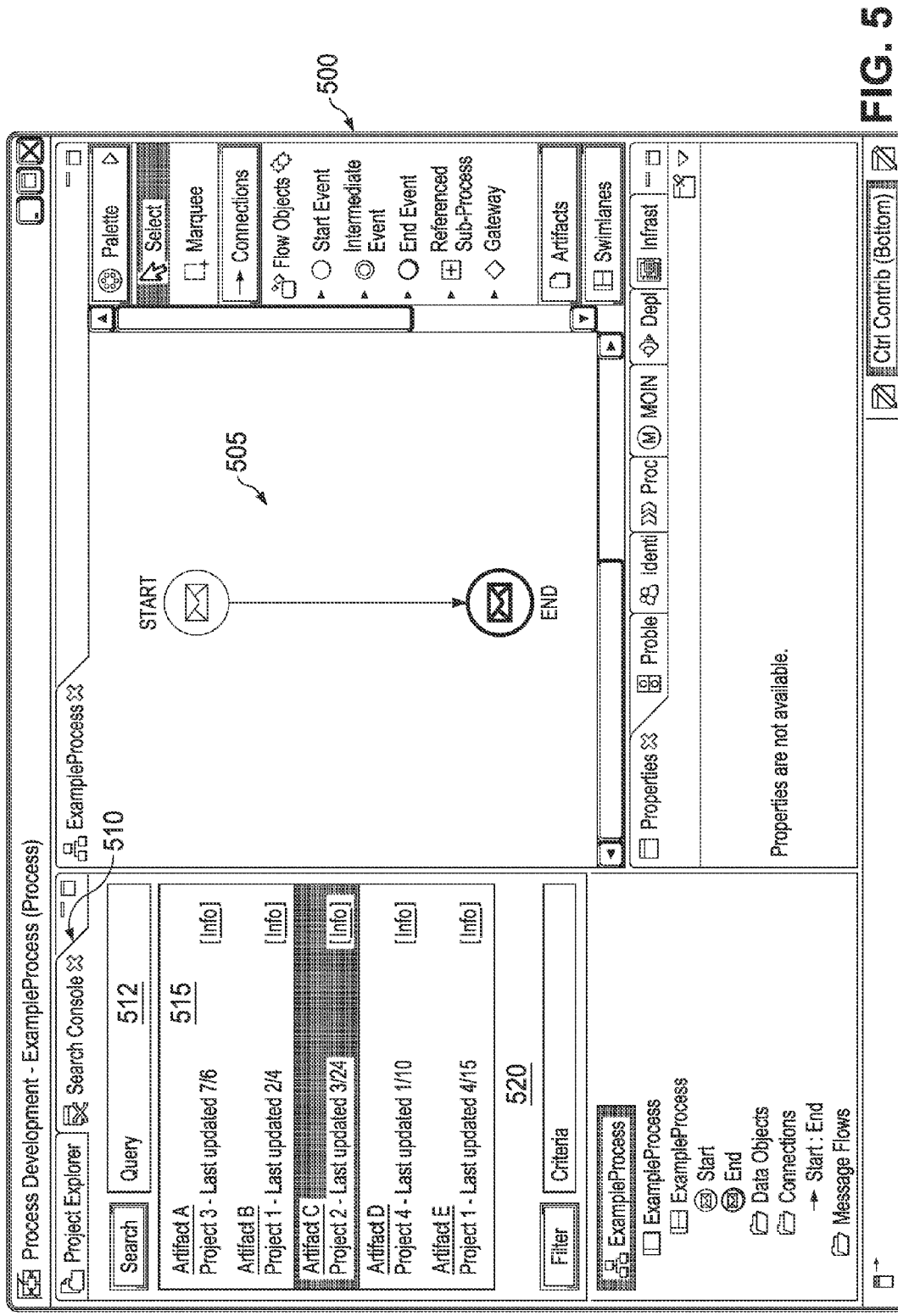
FIG. 5 is an example screenshot of a user interface of an integrated development environment incorporating a development artifact search tool.

FIG. 5 illustrates an example screenshot 500 of an integrated development environment that includes a development artifact tool. The integrated development environment can include one or more user interfaces, including a graphical workspace 505 for building, testing, and modeling development components, development artifacts, and other software entities. In addition, a search interface 510 can be provided, wherein a user can enter one or more search queries 512 directed to a search of one or more repositories of development artifacts. The search interface 510 can include a result window 515 displaying results returned for a particular search query. Individual results, or development artifacts, can be selected from the result window 515 and opened, copied, provided, or presented to or otherwise accessed by the user. In some instances, a user can click, drag-and-drop, or otherwise select one or more development artifacts (e.g., Artifact C, in the present example) presented in a listing of search results displayed in the search result window 515 to give the user access to the development artifact to modify or incorporate the development artifact in connection with a project through the integrated development environment. Additionally, other buttons and interactive fields can be provided, such as a search results filter 520, to allow the user to further interact with, filter, sort, group, save, bookmark, and modify a listing of development artifact search results. Additional information and resources can also be presented to the user, such as related documentation, key user data, an associated project, the time of a last update to the artifact, etc., to assist the user in quickly identifying those artifacts most responsive to the user's search query.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Other variations are within the scope of the following claims.

What is claimed is:

1. A computer-implemented method comprising:
receiving, through an interface of an integrated development environment, a search query for development artifacts, the search query identifying at least one search term;
using an index to identify a set of search results, the index identifying a plurality of development artifacts and including context data identifying attributes of the plurality of development artifacts and different network locations for different computing devices in the integrated development environment used to develop the plurality of development artifacts, the set of search results identifying a subset of the plurality of development artifacts determined to potentially relate to the at least one search term;
presenting a listing of at least a portion of the set of search results to a user, the listing including at least one development artifact in the subset of the plurality of development artifacts;
in response to a selection of the at least one development artifact, determining a computing device from the different computing devices in the integrated development environment used to develop the at least one development artifact based on an associated network location for the computing device identified in the context data; and
retrieving, using the network location, the at least one development artifact directly from the computing device in the integrated development environment used to develop the at least one development artifact using.

2. The method of claim 1, further comprising:
using a crawler to identify the plurality of development artifacts in a plurality of repositories and context data associated with at least one of the plurality of development artifacts; and
building the index to include the plurality of development artifacts and the context data identified by the crawler.

3. The method of claim 1, further comprising:
receiving a user request to retrieve at least one particular development artifact from the subset of the plurality of development artifacts; and
retrieving the at least one particular development artifact for use in the integrated development environment.

4. The method of claim 1, wherein the search query is submitted by a user of the integrated development environment.

5. The method of claim 4, wherein identifying the subset of the plurality of development artifacts includes identifying at least one attribute of the user, wherein the subset of the plurality of development artifacts is determined to potentially relate to the at least one search term based at least in part on the identified attribute of the user.

6. The method of claim 5, wherein the attribute identifies a development category associated with the user.

7. The method of claim 5, wherein the attribute identifies at least one of a developer role of the user, user permissions, an organization associated with the user, or prior development artifacts used by the user.

8. The method of claim 5, wherein identifying the subset of the plurality of development artifacts includes identifying at least one development artifact previously accessed by another user sharing the at least one attribute with the user.

9. The method of claim 5, wherein the listing is ordered to present a first development artifact in the subset before a second development artifact in the subset based on a prediction that the first development artifact is more relevant to the use than the second development artifacts, the prediction based at least in part on the identified attribute of the user.

10. The method of claim 1, further comprising:
identifying a modification made by a user to a development artifact in the plurality of development artifacts; and
updating context data associated with the modified development artifact,
wherein identifying the modification and updating context data substantially immediately following the modification.

11. The method of claim 10, wherein the modification is made in the integrated development environment.

12. The method of claim 10, wherein the modification is made by a remote computing device.

13. The method of claim 1, wherein the set of search results is identified based at least in part on at least one search algorithm, the search algorithm including at least one of fuzzy, lexical, and cross-language searching.

14. The method of claim 1, further comprising identifying development documentation associated with at least one development artifact in the subset of the plurality of development artifacts, wherein the listing identifies the development documentation.

15. The method of claim 1, further comprising identifying at least one development project associated with at least one development artifact in the subset of the plurality of development artifacts, wherein the listing identifies the development project as associated with the corresponding development artifact in the subset.

16. The method of claim 1, further comprising identifying at least one developer who previously accessed at least one development artifact in the subset of the plurality of development artifacts, wherein the listing identifies the at least one developer as associated with the corresponding development artifact in the subset.

17. The method of claim 1, wherein the context data includes unstructured and structured data.

18. A system having processors, comprising:
   a plurality of repositories storing a plurality of development artifacts;
   an integrated development environment implemented on at least one computer; and
   a development artifact search engine implemented on at least one computer, the search engine operable to interact with the integrated development environment and the plurality of repositories and perform operations comprising:
      using a crawler to identify a plurality of development artifacts in the plurality of repositories;
      building an index identifying each identified development artifact and including context data identifying attributes of the plurality of development artifacts different network locations for different computing devices used to develop the plurality of development artifacts;
      receiving, through an interface of the integrated development environment, a search query for development artifacts, the search query identifying at least one search term;
      using the index to identify a subset of the plurality of development artifacts determined to potentially relate to the at least one search term based on at least one criterion;
      sending a listing for presentation to a user, the listing identifying the subset of the plurality of development artifacts;
      receiving a user request to retrieve at least one particular development artifact from the plurality of development artifacts;
      determining a computing device from the different computing devices in the integrated development environment used to develop the at least one development artifact based on an associated network location for the computing device identified in the context data; and
      retrieving, using the network location, the at least one particular development artifact for use in the integrated development environment directly from the computing device used to develop the least one particular development artifact; and
   the integrated development environment implemented on at least one computer and including a development artifact search tool, the search tool operable to interact with the search engine.

19. The system of claim 18, wherein at least one of the plurality of repositories is a remote repository and the at least one computer implementing the development artifact search engine is operable to interact with the remote repository through a data communication network.

20. The system of claim 18, wherein the development artifact search engine is further adapted to filter, sort, or rank the listing according to an identified user attribute.

21. An article comprising a non-transitory, machine-readable storage device storing instructions operable to cause at least one processor to perform operations comprising:
   using a crawler to identify a plurality of development artifacts in a plurality of repositories;
   building an index identifying each identified development artifact and including context data identifying attributes of the plurality of development artifacts different network locations for different computing devices used to develop the plurality of development artifacts;
   receiving, through an interface of an integrated development environment, a search query for development artifacts, the search query identifying at least one search term;
   using the index to identify a subset of the plurality of development artifacts determined to potentially relate to the at least one search term based on at least one criterion;
   sending a listing for presentation to a user, the listing identifying the subset of the plurality of development artifacts;
   receiving a user request to retrieve at least one particular development artifact from the plurality of development artifacts;
   determining a computing device from the different computing devices in the integrated development environment used to develop the at least one development artifact based on an associated network location for the computing device identified in the context data; and
   retrieving, using the network location, the at least one particular development artifact for use in the integrated development environment directly from the computing device used to develop the least one particular development artifact.

* * * * *